United States Patent
Numata

(10) Patent No.: US 9,448,747 B2
(45) Date of Patent: Sep. 20, 2016

(54) POWER SUPPLY CONTROL TECHNIQUE FOR AN IMAGE FORMING APPARATUS, MANAGEMENT APPARATUS, AND METHOD FOR CONTROLLING THE SAME

(71) Applicant: CANON KABUSHIKI KAISHA, Tokyo (JP)

(72) Inventor: Masahito Numata, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 926 days.

(21) Appl. No.: 13/647,082

(22) Filed: Oct. 8, 2012

(65) Prior Publication Data

US 2013/0096730 A1    Apr. 18, 2013

(30) Foreign Application Priority Data

Oct. 13, 2011 (JP) .................................. 2011-225669

(51) Int. Cl.
*G06K 15/00* (2006.01)
*G06F 3/12* (2006.01)

(52) U.S. Cl.
CPC ........... *G06F 3/1204* (2013.01); *G06F 3/1229* (2013.01); *G06F 3/1285* (2013.01); *G06K 15/40* (2013.01); *G06K 15/4055* (2013.01); *G06K 15/402* (2013.01)

(58) Field of Classification Search
None
See application file for complete search history.

(56) References Cited

U.S. PATENT DOCUMENTS

| | | | | |
|---|---|---|---|---|
| 2002/0059318 A1* | 5/2002 | Nomura | ............. | H04N 1/00002 |
| 2003/0009705 A1* | 1/2003 | Thelander | ............. | G06F 1/3203 |
| | | | | 713/340 |
| 2003/0227642 A1* | 12/2003 | Anderson | ............. | G06F 1/3203 |
| | | | | 358/1.13 |
| 2005/0094182 A1* | 5/2005 | Reese | ................ | H04N 1/00278 |
| | | | | 358/1.14 |
| 2006/0015734 A1* | 1/2006 | Atobe | ..................... | G06F 21/10 |
| | | | | 713/176 |
| 2007/0039504 A1* | 2/2007 | Edwards | ................ | B41J 2/5056 |
| | | | | 101/484 |
| 2007/0061279 A1* | 3/2007 | Christiansen | ......... | G06F 11/008 |
| 2007/0172281 A1* | 7/2007 | Inoue | ..................... | G06F 3/1208 |
| | | | | 400/62 |
| 2007/0208863 A1* | 9/2007 | Otsuka | ............... | H04N 1/00222 |
| | | | | 709/227 |
| 2008/0028448 A1* | 1/2008 | Tsuchitoi | ............. | G06F 3/1214 |
| | | | | 726/6 |
| 2009/0257771 A1* | 10/2009 | Takesada | ............... | G03G 21/02 |
| | | | | 399/79 |
| 2010/0259778 A1* | 10/2010 | Kashioka | ............. | G06F 3/1222 |
| | | | | 358/1.14 |
| 2012/0042065 A1* | 2/2012 | Takahashi | ............. | G06F 3/1203 |
| | | | | 709/224 |
| 2012/0044011 A1* | 2/2012 | Helle | ......................... | G06F 1/26 |
| | | | | 327/392 |
| 2013/0204400 A1* | 8/2013 | Utsumi | ............. | G03G 15/5004 |
| | | | | 700/14 |
| 2013/0215446 A1* | 8/2013 | Imai | ..................... | H04N 1/4426 |
| | | | | 358/1.13 |

FOREIGN PATENT DOCUMENTS

JP        2007-320051 A    12/2007

* cited by examiner

*Primary Examiner* — Ming Hon
(74) *Attorney, Agent, or Firm* — Canon U.S.A., Inc. IP Division

(57) ABSTRACT

In an image forming apparatus, a shutdown request unit controls the image forming apparatus to perform shutdown at shutdown execution date and time included in schedule information, which is set beforehand and managed by a schedule management unit. A function restriction management unit restricts at least part of a plurality of functions of the image forming apparatus stepwise at timing earlier than the shutdown execution date and time, and a message management unit notifies a user of a message whose content is differentiated in each of steps.

11 Claims, 15 Drawing Sheets

FIG.6

SHUTDOWN SETTINGS

601 — SHUTDOWN SCHEDULE

601a — EXECUTE AT DESIGNATED DATE AND TIME ⌄
EXECUTE PERIODICALLY
EXECUTE PROMPTLY

601b — EXECUTION DATE  2011/4/5  (YYYY/MM/DD)
601c — EXECUTION START TIME  23:00  (hh:mm)
602 — ☑ REPORT SHUTDOWN SCHEDULE    REPORT SETTINGS — 602a

603a — ☑ SET POWER-OFF CONTINUATION PERIOD
603b — COMPLETION DATE  2011/4/6  (YYYY/MM/DD)
603c — COMPLETION TIME  23:00  (hh:mm)
603d — PROCESSING TO BE PERFORMED IF DEVICE IS ACTIVATED BEFORE COMPLETION DATE AND TIME

603 —
- ⦿ FORCIBLY SHUT DOWN IMMEDIATELY    603e
- ○ SHUT DOWN AFTER DESIGNATED TIME HAS ELAPSED  [  ] MINUTES (0-120)
- ○ SHUT DOWN AFTER DETECTION OF DESIGNATED NUMBER OF LOGOUTS [  ] TIMES
- ○ OUTPUT WARNING    603f

604 — OPERATION TO BE PERFORMED IF ANY JOB IS CURRENTLY EXECUTED IN DEVICE
SHUTDOWN STANDBY TIME [  ] MINUTES (0-120) — 604a
604b — ☑ FORCIBLY SHUT DOWN IF STANDBY TIME HAS ELAPSED

OK (605)    CANCEL (606)

FIG.7

SHUTDOWN SCHEDULE REPORT SETTINGS

| | | |
|---|---|---|
| 701 — REPORT START TIME | 24 HOURS BEFORE — 702a | 707 — [DELETE] |
| 702 — REPORT COMPLETION TIME | 2 HOURS BEFORE — 702b | |
| 703 — MESSAGE | CHECKUP OF ELECTRIC EQUIPMENT IS SCHEDULED ON X-TH DAY OF Y-TH MONTH. | |
| | POWER WILL BE TURNED OFF AT 11 PM. | |
| | BEWARE OF RESTRICTION ABOUT USABLE FUNCTIONS SCHEDULED AT 9 PM. | |
| 704 — RESTRICTED FUNCTION | ☐ COPY    ☐ FAX TRANSMISSION | |
| | ☐ PRINT    ☐ Send | 705 |
| | FUNCTION RESTRICTION DETAILS SETTING | |

| | | |
|---|---|---|
| 701 — REPORT START TIME | 2 HOURS BEFORE | DELETE |
| REPORT COMPLETION TIME | 30 MINUTES BEFORE | |
| MESSAGE | POWER WILL BE TURNED OFF AT 11 PM. | |
| | FUNCTION IS PARTLY RESTRICTED AT PRESENT. | |
| | | |
| | EMERGENCY CONTACT: YAMADA (TEL XXXXX) | |
| RESTRICTED FUNCTION | ☐ COPY    ☐ FAX TRANSMISSION | |
| | ☑ PRINT   ☐ Send | |
| | FUNCTION RESTRICTION DETAILS SETTING | |

| | | |
|---|---|---|
| 701 — REPORT START TIME | 30 MINUTES BEFORE | DELETE |
| REPORT COMPLETION TIME | EXECUTION TIME | |
| MESSAGE | POWER WILL BE TURNED OFF AT 11 PM. | |
| | CHECKED FUNCTIONS ARE NOT AVAILABLE AT PRESENT. | |
| | | |
| | EMERGENCY CONTACT: YAMADA (TEL XXXXX) | |
| RESTRICTED FUNCTION | ☑ COPY    ☑ FAX TRANSMISSION | |
| | ☑ PRINT   ☑ Send | |
| | FUNCTION RESTRICTION DETAILS SETTING | |

706 — [REPORT MESSAGE ADDITION]

708 — RESTRICTED FUNCTION RELEASE CODE [****]
709 — SHUTDOWN SCHEDULE RELEASE CODE [****]

710 — [OK]    [CANCEL] — 711

FIG.9

```
<SystemAccessControl>
  <AttributeCategory Name="Application">
    <saml:Attribute Name="FAX">
      <saml:AttributeValue>Deny</saml:AttributeValue>
    </saml:Attribute>
    <saml:Attribute Name="PdlPrint">
      <saml:AttributeValue Name="PermitPages">20</saml:AttributeValue>
    </saml:Attribute>
    <saml:Attribute Name="Copy">
      <saml:AttributeValue Name="PermitPages">20</saml:AttributeValue>
      <saml:AttributeValue Name="DetailSetting">Deny</saml:AttributeValue>
    </saml:Attribute>
    <saml:Attribute Name="ContentsPrintService">
      <saml:AttributeValue>Deny</saml:AttributeValue>
    </saml:Attribute>
    <saml:Attribute Name="ScanService">
      <saml:AttributeValue>Deny</saml:AttributeValue>
    </saml:Attribute>
  </AttributeCategory>
</SystemAccessControl>
```

POWER SUPPLY CONTROL TECHNIQUE FOR AN IMAGE FORMING APPARATUS, MANAGEMENT APPARATUS, AND METHOD FOR CONTROLLING THE SAME

BACKGROUND OF THE INVENTION

1. Field of the Invention

The present invention relates to a power supply control technique for an image forming apparatus.

2. Description of the Related Art

There is a need to shut down an image forming apparatus during a designated period to perform an electric checkup work in an office building. In this case, to reduce the labor of a management user, a function capable of automatically shutting down the image forming apparatus at date and time scheduled beforehand is required.

However, an image forming apparatus may be used by numerous general users. Therefore, a general user may happen to be operating the image forming apparatus to execute a job at the date and time scheduled by a management user. Thus, it is desired to take a currently executed job into consideration in realizing the shutdown function. For example, if a currently executed job is forcibly cancelled to shut down an image forming apparatus, it will be dissatisfactory for a general user. In such a case, the user may restart up the image forming apparatus.

In this respect, as discussed in Japanese Patent Application Laid-Open No. 2007-320051, there is a technique that includes a remote operation for instructing shutdown of an image forming apparatus and, if a currently executed job is present, performing the shutdown after the currently executed job is completed.

However, depending on the purpose of the shutdown like an electric checkup work, it is important to perform the shutdown at predetermined date and time as planed beforehand. According to the above-described technique discussed in Japanese Patent Application Laid-Open No. 2007-320051, if the currently executed job requires a long time to accomplish, or when there are numerous jobs that are currently queued, actual shutdown execution date and time may greatly deviate from the scheduled date and time.

Further, for the electric checkup work, it is important to maintain the image forming apparatus in a power-OFF state for a designated period. However, according to the above-described technique discussed in Japanese Patent Application Laid-Open No. 2007-320051, the image forming apparatus cannot be maintained in the power-OFF state if it is restarted up by a general user.

SUMMARY OF THE INVENTION

The present invention is directed to a technique capable of reducing a probability of the presence of a general user's job at the time when an image forming apparatus is shut down, so that a shutdown operation for the image forming apparatus can be performed at scheduled date and time. Further, the present invention is directed to a technique capable of maintaining a power-OFF state of the image forming apparatus during a designated period.

According to an aspect of the present invention, an image forming apparatus includes a storage unit configured to store schedule information that includes shutdown execution date and time, as date and time scheduled to execute a shutdown operation for the image forming apparatus, a shutdown unit configured to control the image forming apparatus to perform shutdown at the shutdown execution date and time included in the schedule information, a restricting unit configured to restrict at least part of a plurality of functions of the image forming apparatus stepwise at timing earlier than the shutdown execution date and time included in the schedule information, and a notification unit configured to notify a user of a message whose content is differentiated in each of the steps.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 6 illustrates an example of a shutdown setting screen.

FIG. 7 illustrates an example of a shutdown schedule report setting screen.

FIG. 9 illustrates an example of a restricted function file that can be used to enable an image forming apparatus to realize restricted functions having been set.

DESCRIPTION OF THE EMBODIMENTS

Various exemplary embodiments, features, and aspects of the invention will be described in detail below with reference to the drawings.

Figure 1:
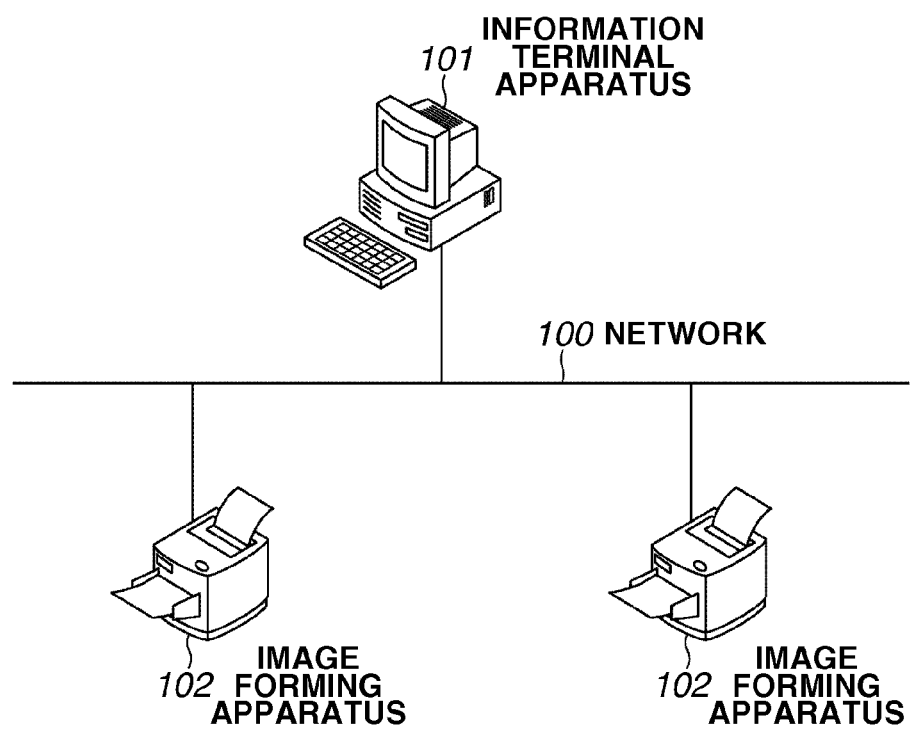
FIG. 1 illustrates an example configuration of a shutdown system, to which an image forming apparatus and a management apparatus according to a first exemplary embodiment of the present invention are applicable.

FIG. 1 illustrates an example configuration of a shutdown system that includes an image forming apparatus and a management apparatus according to a first exemplary embodiment of the present invention. As illustrated in FIG. 1, the shutdown system according to the present exemplary embodiment includes an information terminal apparatus 101 and a plurality of image forming apparatuses 102, which are connected via a network 100 to communicate with each other. The information terminal apparatus 101 is functionally operable as a management apparatus configured to manage the image forming apparatuses 102. The information terminal apparatus 101 is not always required. It is useful to provide at least one image forming apparatus.

The network 100 is a communication line that enables the above-described apparatuses to transmit and receive information. The network 100 is, for example, Internet or an intranet and can be a wired type or a wireless type. Further, the information terminal apparatus 101 is not limited to a personal computer. It will be apparent to those skilled in the art that the information terminal apparatus 101 can be any information processing apparatus, such as a portable terminal or an image forming apparatus, which has similar or comparable functions.

Figure 2:
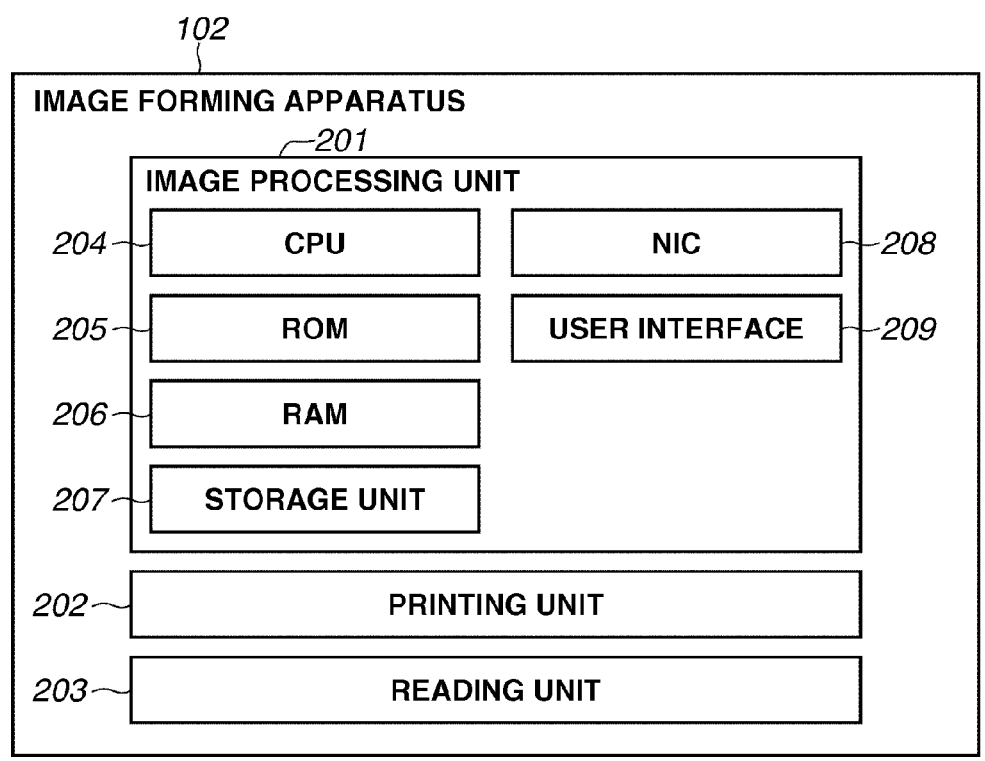
FIG. 2 is a block diagram illustrating a hardware configuration of the image forming apparatus.

Next, a hardware configuration of each apparatus that constitute the shutdown system is described with reference to FIG. 2 and FIG. 3. FIG. 2 is a block diagram illustrating an example hardware configuration of the image forming apparatus 102 illustrated in FIG. 1. As illustrated in FIG. 2, the image forming apparatus 102 includes an image processing unit 201, a printing unit 202, and a reading unit 203. If the image forming apparatus 102 is not a multifunction peripheral, the image forming apparatus 102 may not include the reading unit 203.

The image processing unit 201 includes a central processing unit (CPU) 204, a read only memory (ROM) 205, a random access memory (RAM) 206, a storage unit 207, a network interface card (NIC) 208, and a user interface (UI) 209. The image processing unit 201 may not include the storage unit 207.

The CPU 204 is a control unit configured to execute various programs to realize various functions. The ROM 205 is a computer-readable unit configured to store various programs. The CPU 204 can execute a program stored in the ROM 205 by loading the program into the RAM 206. The RAM 206 can be used as a temporary work storage area of the CPU 204.

The storage unit 207 is a unit configured to store various data. For example, the storage unit 207 is a hard disk drive (HDD) or a flash memory. The NIC 208 is a unit configured to connect the image forming apparatus 102 to the network 100.

The user interface 209 is a unit configured to receive a processing request from a user and output various screens to the user. The user interface 209 may be an operation panel associated to the image forming apparatus 102. The user interface 209 can receive, for example, a Hypertext Transfer Protocol (HTTP) processing request from the information terminal apparatus 101 and can output information via a user interface 305 (see FIG. 3) of the information terminal apparatus 101.

The printing unit 202 is a unit configured to perform printing on a sheet based on print data. The reading unit 203 is a unit configured to read image data from a document. The configuration illustrated in FIG. 2 is a representative hardware configuration of the image forming apparatus. It will be apparent to those skilled in the art that the configuration of the image forming apparatus 102 is not limited to the example illustrated in FIG. 2. For example, the image forming apparatus 102 can be connected to a facsimile board or an external control apparatus.

Figure 3:
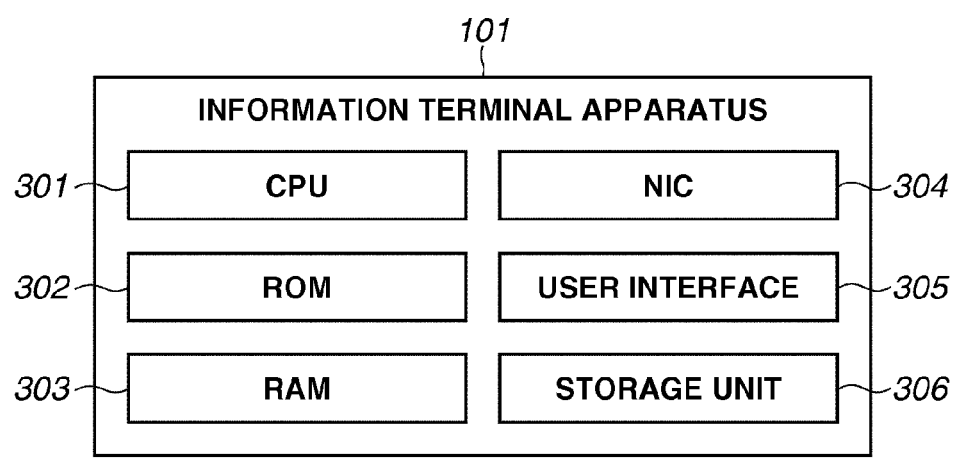
FIG. 3 is a block diagram illustrating a hardware configuration of an information terminal apparatus.

FIG. 3 is a block diagram illustrating a hardware configuration of the information terminal apparatus 101 illustrated in FIG. 1. A CPU 301 is a control unit configured to execute various programs to realize various functions. A ROM 302 is a computer-readable unit configured to store various programs. The CPU 301 can execute a program when the program is loaded into a RAM 303 from the ROM 302 or a storage unit 306 described below. The RAM 303 can be used as a temporary work storage area of the CPU 301.

A network interface card (NIC) 304 is a unit configured to connect the information terminal apparatus 101 to the network. The information terminal apparatus 101 can be connected to the network 100 via the NIC 304.

The user interface (UI) 305 is a unit configured to receive a processing request from a user and output various screens to the user. The user interface 305 may include, for example, a display device, a keyboard, a pointing device, or a touch panel display device.

The storage unit 306 is a unit configured to store various data. For example, the storage unit 306 is a HDD or a flash memory. Further, the storage unit 306 is a computer-readable device capable of storing various programs. The configuration illustrated in FIG. 3 is a representative hardware configuration of the information terminal apparatus. It will be apparent to those skilled in the art that the configuration of the information terminal apparatus 101 is not limited to the example illustrated in FIG. 3.

Figure 4:
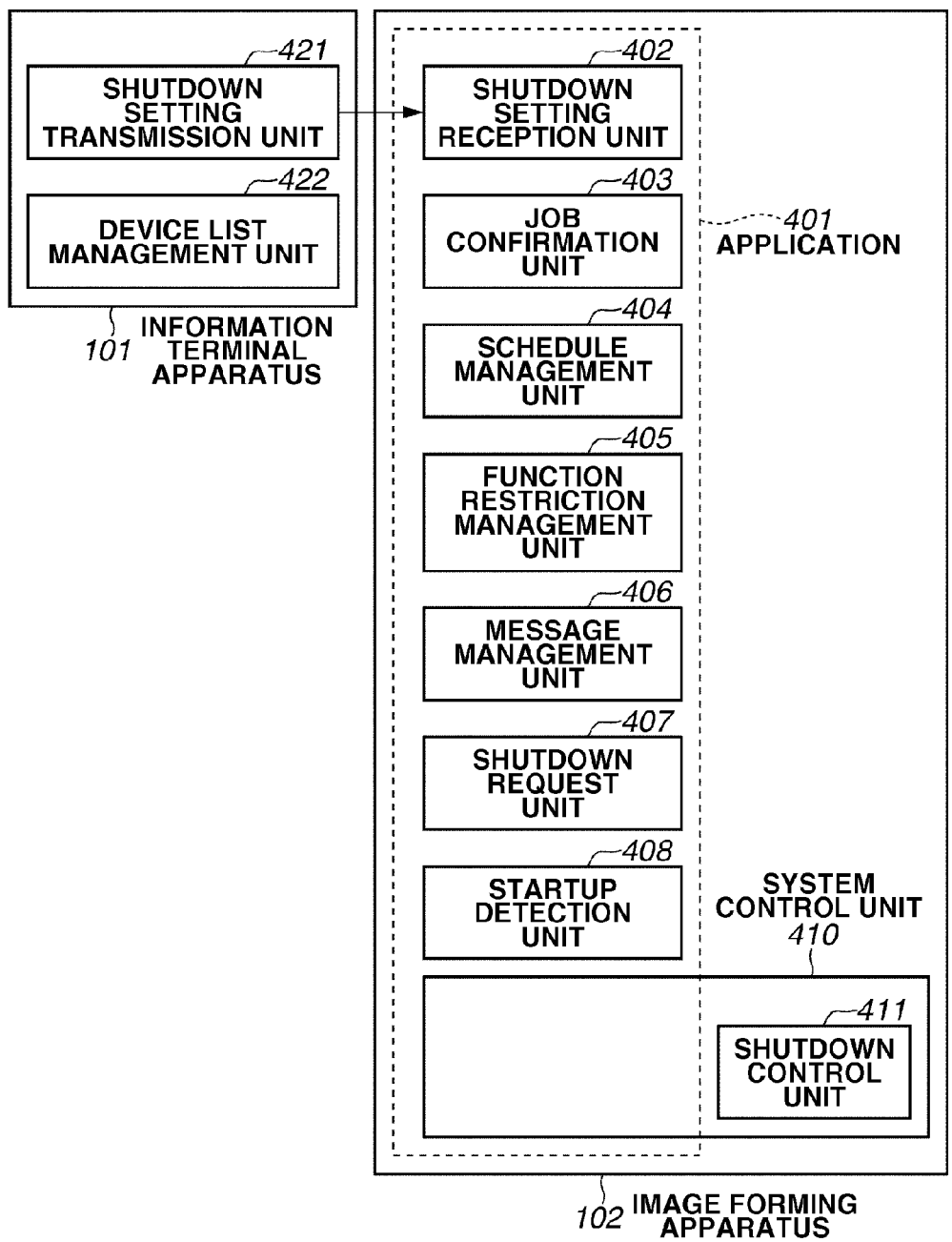
FIG. 4 is a block diagram illustrating a software configuration of each apparatus included in the shutdown system according to the first exemplary embodiment.

FIG. 4 is a block diagram illustrating a software configuration of each apparatus included in the shutdown system according to the first exemplary embodiment. A computer-readable program that can realize respective functions of the software configuration of the image forming apparatus 102 illustrated in FIG. 4 is stored in the ROM 205 of the image forming apparatus 102. To realize the above-described functions, the CPU 204 of the image forming apparatus 102 loads the program into the RAM 206 and executes the loaded program.

Further, a computer-readable program that can realize respective functions of the software configuration of the information terminal apparatus 101 illustrated in FIG. 4 is stored in the storage unit 306 of the information terminal apparatus 101. To realize the above-described functions, the CPU 301 of the information terminal apparatus 101 loads the program into the RAM 303 and executes the loaded program.

First, the software configuration of the image forming apparatus 102 is described below. An application 401 is capable of controlling a shutdown operation of the image forming apparatus 102 so as to be executed according to scheduled date and time. The application 401 includes a shutdown setting reception unit 402, a job confirmation unit 403, a schedule management unit 404, a function restriction management unit 405, a message management unit 406, a shutdown request unit 407, and a startup detection unit 408.

A system control unit 410 can control operations of each software that constitutes the application 401 and various functions to be performed by the image forming apparatus 102. The system control unit 410 includes a shutdown control unit 411.

The shutdown control unit 411 can control shutdown processing to be performed by the image forming apparatus 102. In response to a shutdown execution instruction, the shutdown control unit 411 successively stops each application of the image forming apparatus 102 and further stops the image processing unit 201, the printing unit 202, and the reading unit 203. Finally, the shutdown control unit 411 turns off the power source of the image forming apparatus 102. According to the present exemplary embodiment, the application 401 instructs the shutdown control unit 411 to execute shutdown processing. Similarly, in a case where a power switch (not illustrated) of the image forming apparatus 102 is turned off, the application 401 instructs the shutdown control unit 411 to execute shutdown processing.

Next, each configuration element of the application 401 is described. The shutdown setting reception unit 402 is configured to receive shutdown related settings (schedule information), including shutdown schedule settings (see FIG. 6), shutdown schedule report settings (see FIG. 7), function restriction detailed settings (see FIG. 8) and the like, and store the received setting information in the storage unit 207. The shutdown setting reception unit 402 can receive shutdown related settings from a shutdown setting transmission unit 421 of the information terminal apparatus 101. In addition, in a case where the shutdown system does not include the information terminal apparatus 101, the image forming apparatus 102 may display various setting screens (see FIG. 6 to FIG. 8) on the UI 209 thereof and directly accept shutdown settings without using the information terminal apparatus 101.

The job confirmation unit 403 is configured to check if there is any print job or copy job currently executed or queued in the image forming apparatus 102 when the shutdown is instructed by the application 401.

The schedule management unit 404 is configured to manage schedules such as a shutdown execution schedule and a report message display schedule, based on a comparison between the present date and time of the image forming apparatus 102 and schedule settings (schedule information) received by the shutdown setting reception unit 402 and stored in the storage unit 207.

The function restriction management unit 405 is configured to restrict functions of the image forming apparatus 102 that can be used by a user based on function restriction settings illustrated in FIG. 7 or FIG. 8 described below. The message management unit 406 is configured to output a message designated by the shutdown schedule report settings (see FIG. 7) according to the display schedule having been set. The above-described message and the display schedule having been set is included in the above-described schedule information received by the shutdown setting reception unit 402 and stored in the storage unit 207.

The shutdown request unit 407 is configured to instruct the shutdown control unit 411 to perform shutdown processing. The startup detection unit 408 is configured to detect a startup operation of the image forming apparatus 102.

The information terminal apparatus 101 includes the following software configuration. The shutdown setting transmission unit 421 is configured to transmit the shutdown related settings (i.e., the above-described schedule information), including the shutdown schedule settings (see FIG. 6), the shutdown schedule report settings (see FIG. 7), the function restriction detailed settings (see FIG. 8), and the like to the shutdown setting reception unit 402 of the image forming apparatus 102.

Figure 5:
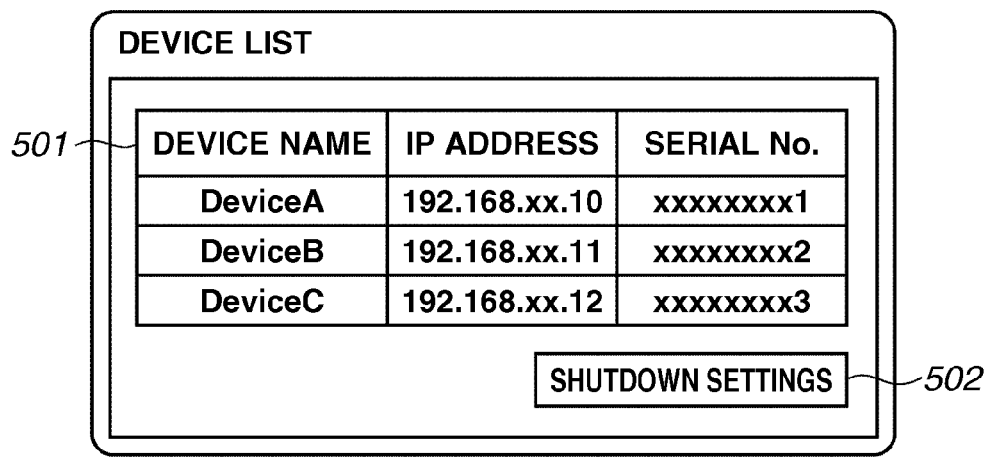
FIG. 5 illustrates an example of a device list management screen that can be displayed on a user interface by a device list management unit of the information terminal apparatus.

A device list management unit 422 is configured to manage a plurality of image forming apparatuses 102 that constitutes the shutdown system based on information included in a device list illustrated in FIG. 5. Further, the device list management unit 422 can display the screens as illustrated in FIG. 5 to FIG. 8 on the user interface 305 of the information terminal apparatus 101 to enable each user to input information relating to the above-described shutdown related settings.

The shutdown setting transmission unit 421 can transmit the above-described shutdown related settings (i.e., the schedule information) received from the device list management unit 422 to the shutdown setting reception unit 402 of the image forming apparatus. In addition, the shutdown setting transmission unit 421 can transmit the shutdown related settings (i.e., the schedule information) simultaneously to a plurality of image forming apparatuses managed by the device list management unit 422.

FIG. 5 illustrates an example of a device list management screen that can be displayed on the user interface 305 by the device list management unit 422 of the information terminal apparatus 101. According to the example illustrated in FIG. 5, the device list management unit 422 manages three devices "DeviceA", "DeviceB", and "DeviceC", and a user can register each image forming apparatus as a management target via a device registration screen (not illustrated). Through the registration processing, information relating to the management target image forming apparatus (e.g., device name, IP address, serial number, Mac address, etc.) is stored in the storage unit 306 of the information terminal apparatus 101.

A device list display portion 501 displays a list of management target image forming apparatuses. In the present exemplary embodiment, the list includes three display items (i.e., device name, IP address, and serial number). However, it will be apparent to those skilled in the art that the display items are not limited to the example illustrated in FIG. 5. For example, the list can include a Mac address and a setup location as additional display items.

A management user can select at least one of the image forming apparatuses displayed in the device list display portion 501. A shutdown setting button 502 is operable to instruct shutdown settings for one or more image forming apparatuses selected from the device list display portion 501. The management user can open the shutdown schedule settings screen (see FIG. 6) by pressing the shutdown setting button 502. If the shutdown setting button 502 is pressed in a state where a plurality of image forming apparatuses is selected from the device list display portion 501, the device list management unit 422 simultaneously instructs the plurality of selected image forming apparatuses to perform shutdown processing via the shutdown setting transmission unit 421. As described above, in a case where the shutdown system includes the information terminal apparatus 101, it is feasible to simultaneously instruct a plurality of management target image forming apparatuses to perform shutdown processing. Thus, the management user can accomplish the shutdown settings without much ado.

FIG. 6 illustrates an example of the shutdown setting screen. The device list management unit 422 can display the shutdown setting screen illustrated in FIG. 6 on the user interface 305 of the information terminal apparatus 101 in response to pressing of the above-described shutdown setting button 502. In a case where the shutdown system does not include the information terminal apparatus 101, the CPU 204 of the image forming apparatus 102 can be modified to display the above-described screen on the user interface 209 of the image forming apparatus 102.

A shutdown schedule setting portion 601 is usable to designate a shutdown execution schedule. In the present exemplary embodiment, the management user can select one of three options "execute at designated date and time", "execute periodically", and "execute promptly" from a dropdown list 601a. Items settable (schedulable) in a state where the option "execute at designated date and time" is selected include an execution date 601b and an execution start time 601c (i.e., shutdown execution date and time). Further, items settable (schedulable) in a state where the option "execute periodically" is selected include an execution interval and an execution start time although not illustrated in the drawing.

The management user can input a check mark in a shutdown schedule report setting portion 602 if the management user wants to notify a general user of the shutdown schedule settings. In the state where the item 602 is checked, if a report setting button 602a is pressed, a shutdown schedule report setting screen (see FIG. 7) is displayed by the shutdown setting transmission unit 421.

A power-OFF period setting portion 603 is usable to set a power-OFF period during which the image forming apparatus 102 is to be maintained in a power-OFF state (i.e., a shutdown state). The management user can input a check mark in a checkbox 603a if it is required to maintain the image forming apparatus 102 in the power-OFF state for a predetermined period, for example, to perform an electric checkup work.

Items settable in a state that the checkbox 603a is checked include a completion date and a time (i.e., completion date 603b and completion time 603c). Further, the management user can select an appropriate radio button 603d to set processing to be performed when the image forming apparatus is activated before the designated completion date and time. In the present exemplary embodiment, there are four selectable options "forcibly shut down immediately", "shut down after designated time has elapsed", "shut down after detection of designated number of logouts", and "output warning." It will be apparent to those skilled in the art that the selectable options are not limited to the above-described four examples.

For example, the management user can designate the option "forcibly shut down immediately" in a use case where activation of the image forming apparatus is not permitted even for a short time (e.g., an electric checkup work).

Further, the management user can designate the option "shut down after designated time has elapsed" or the option "shut down after detection of designated number of logouts" in a case where a general user can be permitted to use the image forming apparatus for awhile although the apparatus is automatically shut down when a predetermined time has elapsed. For example, it will be desired that the image forming apparatus is shut down during a non-operating period for the purpose of electric power saving. In the state where the option "shut down after designated time has elapsed" is selected, the management user can set a designated time 603e. Further, in the state where the option "shut down after detection of designated number of logouts" is selected, the management user can set a designated number of times 603f.

The management user can designate the option "output warning" in a case where the shutdown timing is flexibly settable depending on a general user. For example, an appropriate message, such as "The power-OFF period starts shortly. Please power down the system upon completion of its usage", can be displayed on the user interface 209 of the image forming apparatus 102 to urge a general user to become aware of a coming shutdown. Through the power-OFF period settings 603, the power-OFF state of the image forming apparatus 102 can be maintained appropriately for a scheduled electric checkup work or in an electric power saving mode.

An "operation to be performed if any job is currently executed" setting portion 604 is usable to set an operation to be performed if the job confirmation unit 403 determines that a currently executed job is present when the shutdown is executed. If a shutdown standby time 604a is set, the shutdown system periodically confirms the presence of any currently executed job without executing the shutdown processing during the standby time and starts the shutdown processing at the time when the currently executed job is completed.

A "forcibly shut down if standby time has elapsed" checkbox 604b is usable to designate an operation to be performed if the currently executed job is still present even when the above-described standby time has elapsed. When the checkbox 604b is checked (i.e., ON), the shutdown system cancels the currently executed job and forcibly starts the shutdown processing. When the checkbox 604b is not checked (i.e., OFF), the shutdown system does not execute the above-described forcible shutdown processing. Further, in the present exemplary embodiment, the shutdown system confirms the currently executed job. In addition, the shutdown system can confirm the presence of any job having been queued and in a standby state.

Through the settings 604, it is feasible to realize the shutdown processing while taking a general user's execution job into consideration. Further, by adjusting the length of the standby time, it is feasible to determine the priority of executing a general user's job or executing shutdown processing at the scheduled date and time.

If an OK button 605 is pressed, the schedule settings (including the settings illustrated in FIG. 7 and FIG. 8) designated by the device list management unit 422 can be sent to the shutdown setting transmission unit 421. The shutdown setting transmission unit 421 transmits the received schedule settings (i.e., the schedule information) to the shutdown setting reception unit 402 of each image forming apparatus 102 selected in the device list (see FIG. 5). Then, the device list management unit 422 closes the shutdown setting screen (see FIG. 6).

If a cancel button 606 is pressed, the device list management unit 422 cancels the shutdown settings and closes the shutdown setting screen (see FIG. 6).

FIG. 7 illustrates an example of the shutdown schedule report setting screen. When the report setting button 602a of the above-described shutdown schedule is pressed, the shutdown schedule report setting screen can be displayed on the user interface 305 of the information terminal apparatus 101, under the control of the device list management unit 422. In a case where the shutdown system does not include the information terminal apparatus 101, the CPU 204 of the image forming apparatus 102 can be modified to display the above-described screen on the user interface 209 of the image forming apparatus 102.

A report setting set 701 includes a report schedule setting portion 702, a report message setting portion 703, a restricted function designation portion 704, a function restriction details setting button 705, and a report message deletion button 707. Each report setting set 701 is usable to set a report schedule, a report message, and a restricted function.

The report schedule setting portion 702 is usable to designate a report start time 702a and a report completion time 702b of the report message or the restricted function with reference to the scheduled shutdown date and time designated in the shutdown schedule setting portion 601.

The report message setting portion 703 is usable to set the contents of a report message to be output. In the present exemplary embodiment, the report message setting portion 703 includes an input field consisting of four rows. However, it will be apparent to those skilled in the art that the input field, an input method, and a character string are not limited to the illustrated examples.

The restricted function designation portion 704 is usable to designate a function usable by a general user, which is to be restricted during the period designated in the report schedule setting portion 702. For example, one or more of a plurality of functions, such as copy, print, FAX transmission, and send, can be designated as restricted functions. Each function checked in the restricted function designation portion 704 cannot be used in the above-described period.

A user may want to prioritize performing the shutdown processing as scheduled, for example, for an electric checkup work. In this case, the user sets forcible shutdown processing to be performed after a designated standby time has elapsed if there is a currently executed job, in the above-described "operation to be performed if any job is currently executed" setting portion 604. However, whether to permit the cancellation of a currently executed job depends on job contents or job status. Accordingly, it is desired that information about the functions designated by the above-described restricted function designation portion 704 or designated in FIG. 8 described below is included in the schedule information as the restricted function information and is set in the image forming apparatus. In this case, the designated functions of the image forming apparatus 102 can be prevented from being used, beforehand. Thus, a general user's job cannot be executed during the shutdown processing.

The function restriction details setting button 705 is usable to designate detailed restriction contents about each function checked in the restricted function designation portion 704. The function restriction detailed settings screen (see FIG. 8) can be opened by pressing the function restriction details setting button 705. For example, with respect to the copy function, it may be desired to restrict a time-consuming or large-scale copy (e.g., a copy exceeding 20 pages) and permit a small-scale copy. In such a case, a user can check the item "copy" in the restricted function designation portion 704 and press the function restriction details setting button 705 to perform function restriction detailed settings that includes prohibiting a print exceeding 20 pages, as described in detail below with reference to FIG. 8. Accordingly, the function restriction can be performed further in detail by the function restriction detailed settings screen.

The contents of the report setting set 701 can be deleted by pressing the report message deletion button 707, under the control of the device list management unit 422. A new report setting set 701 can be added by pressing a report message addition button 706, under the control of the device list management unit 422. In other words, one or more (an arbitrary number of) report setting sets 701 can be registered. More specifically, the schedule information transmitted from the shutdown setting transmission unit 421 to the image forming apparatus 102 includes at least one piece of information having been set in the report setting set 701. Thus, the warning level (or contents) of each report message or the number of restricted functions can be changed stepwise with respect to the scheduled shutdown date and time.

A plurality of the report setting sets 701 can be used to set functions of the image forming apparatus 102 to be restricted stepwise or set different messages to be notified to a user at respective steps, at the time earlier than the shutdown execution date and time (i.e., the date and time specified by the execution date 601*b* and execution start time 601*c* illustrated in FIG. 6). The period corresponding to each step can be set as a period specified by the report start time 702*a* and the report completion time 702*b*. For example, according to the example illustrated in FIG. 7, the function to be restricted and messages to be notified can be set independently for each of three steps, e.g., from "24 hours before" to "two hours before", from "two hours before" to "30 minutes before", and from "30 minutes before" to "execution time", with respect to the time preceding the shutdown execution date and time.

Figure 10:
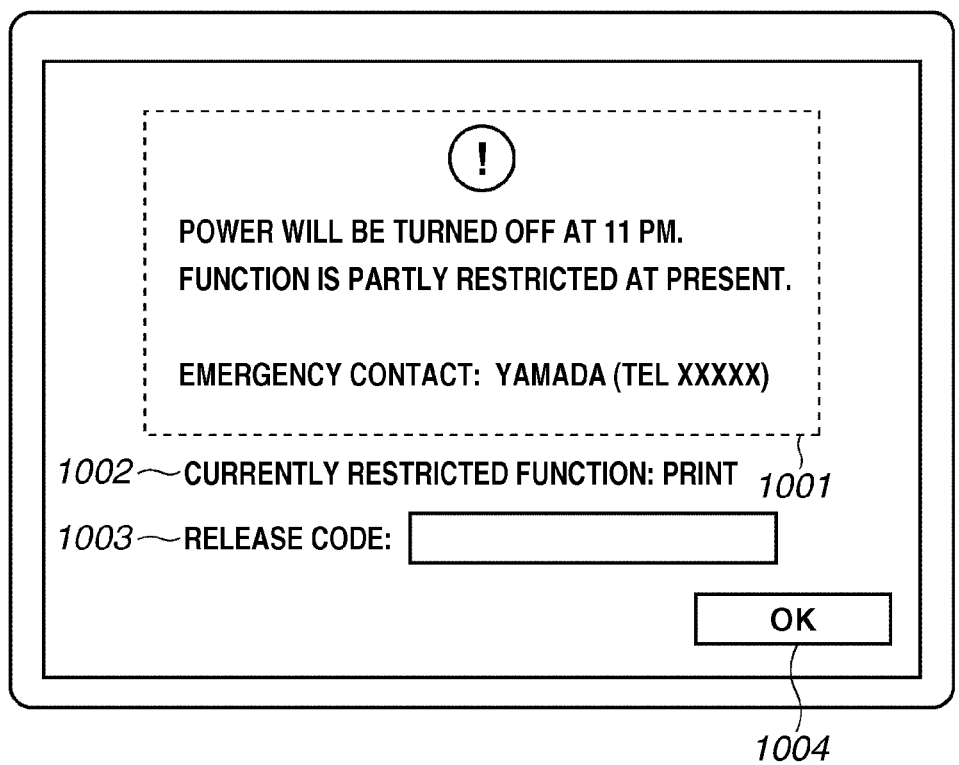
FIG. 10 illustrates an example of a report screen according to the exemplary embodiment.

A restricted function release code designation portion 708 is usable to designate a release code when a management user or a general user wants to release the restricted function displayed on a report message screen illustrated in FIG. 10.

Figure 11:
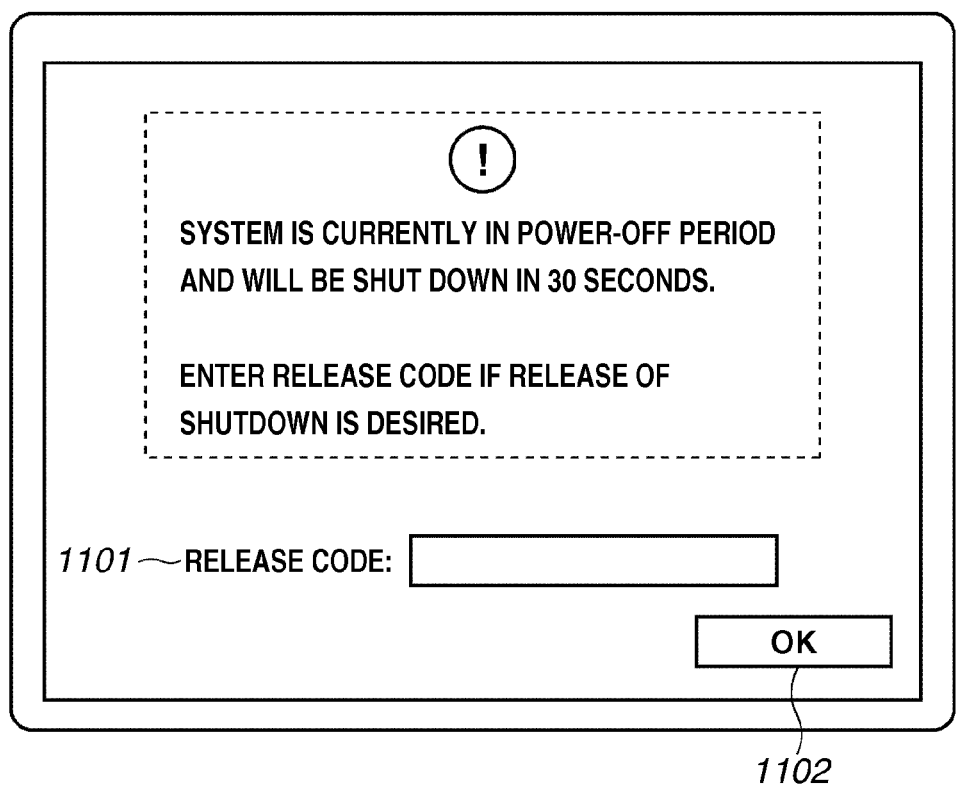
FIG. 11 illustrates an example of a report screen according to the exemplary embodiment.

A shutdown schedule release code designation portion 709 is usable to designate a release code when a management user or a general user wants to release the shutdown schedule displayed on the report message screen illustrated in FIG. 10 or FIG. 11.

If an OK button 710 is pressed, the designated contents can be stored in the RAM 303 or the storage unit 306 and the shutdown setting screen (see FIG. 6) can be reopened under the control of the device list management unit 422. If a cancel button 711 is pressed, the designated contents can be discarded and the shutdown setting screen (see FIG. 6) can be reopened under the control of the device list management unit 422.

Figure 8:
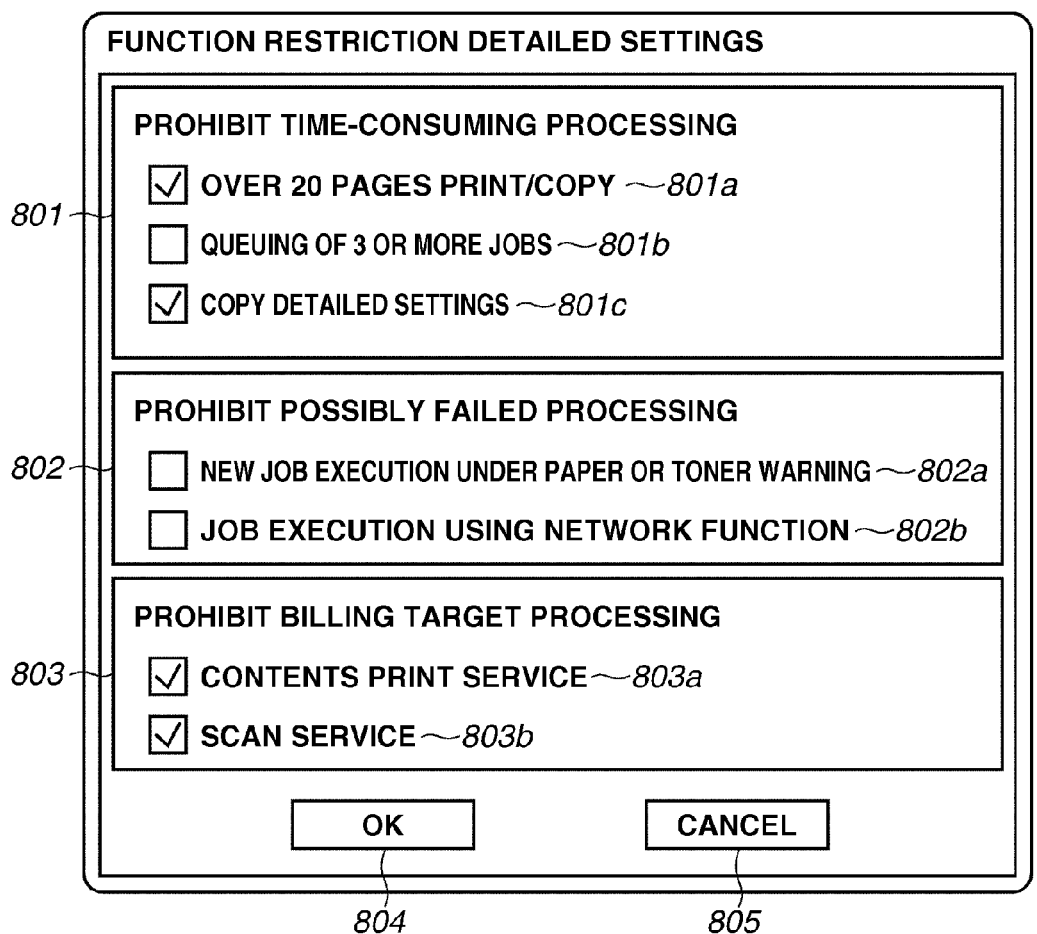
FIG. 8 illustrates an example of a function restriction detailed settings screen.

FIG. 8 illustrates an example of the function restriction detailed setting screen. This screen can be displayed on the user interface 305 of the information terminal apparatus 101 by pressing the above-described function restriction details setting button 705, under the control of the device list management unit 422. In a case where the shutdown system does not include the information terminal apparatus 101, the CPU 204 of the image forming apparatus 102 can be modified to display the above-described screen on the user interface 209 of the image forming apparatus 102.

In the present exemplary embodiment, the function restriction detailed settings include three settings "prohibit time-consuming processing" 801, "prohibit possibly failed processing" 802, and "prohibit billing target processing" 803. These settings are examples of a function according to which a job is possibly executed or failed during execution of the shutdown processing, or a function according to which forcible cancellation greatly influences a general user. However, it will be apparent to those skilled in the art that the function restriction detailed settings are not limited to the above-described examples. Further, it will be apparent to those skilled in the art that the following detailed example in each setting is not limited to a specific example.

The setting fields 801 to 803 are controlled by the device list management unit 422 so that only the items that relate to the functions having been checked in the restricted function designation portion 704 are checkable. For example, it is impossible to check copy detailed settings 801*c* if the copy is not checked in the restricted function designation portion 704.

More specifically, the setting "prohibit time-consuming processing" 801 includes three selectable options "over 20 pages print/copy" 801*a*, "queuing of 3 or more jobs" 801*b*, and "copy detailed settings" 801*c*. By selecting an appropriate option in the "prohibit time-consuming processing" 801, it is feasible to prevent long execution time jobs, a large number of jobs, and time-consuming operations from being executed. Thus, it is feasible to reduce a situation in which a general user's job is executed or operated during the shutdown processing.

Although the first option illustrated in FIG. 8 designates "over 20 pages", the number of prints or copies can be changed to any other value that reflects print processing or copy processing which exceeds a predetermined number of pages and takes a long processing time in the image forming apparatus 102. Further, although the second option designates "3 or more jobs", the number of currently queued jobs can be changed to any other value that corresponds to a predetermined number of jobs which takes a long processing time in the image forming apparatus 102. In short, the numerical values in FIG. 8 are changeable according to the processing capability of the image forming apparatus 102.

The setting "prohibit possibly failed processing" 802 includes two selectable options "new job execution under paper or toner warning" 802a and "job execution using network function" 802b.

For example, performing a printing operation contrary to a warning of a remaining amount of consumables such as sheets and toners may be subjected to an out-of-toner. The execution of a job may be erroneously stopped. If the scheduled shutdown time comes in the above-described situation, the shutdown execution may greatly deviate from the scheduled time or an error job may be forcibly cancelled. A job that uses a network function may be forcibly cancelled during the network communication, if the scheduled shutdown time comes. It is desirable to avoid the above-described situations. In this respect, if an appropriate option is selected in the setting "prohibit possibly failed processing" 802, it can avoid a situation that a general user's job is erroneously performed or is during communication on the network at the time of the shutdown processing.

The setting "prohibit billing target processing" 803 includes two selectable options "contents print service" 803a and "scan service" 803b. As one of the functions, when the function is executed, a service provider may require the image forming apparatus 102 to pay a fee for a job to be executed. In the present exemplary embodiment, the contents print service requires a payment of a fee for the contents (e.g., a poster) to be printed. The scan service requires a payment of a fee according to the volume of documents to be stored. If the shutdown processing is forcibly started in a situation where the above-described pay service is used, the job may not be completed despite of the payment of the fee. In this respect, if an appropriate option is selected in the setting "prohibit billing target processing" 803, it is feasible to prevent a job having a great influence in case of forcible cancellation from being executed at the scheduled shutdown date and time.

If an OK button 804 is pressed, the designated contents can be stored in the RAM 303 or the storage unit 306, and the shutdown schedule report setting screen (see FIG. 7) can be reopened, under the control of the device list management unit 422. If a cancel button 805 is pressed, the designated contents can be discarded and the shutdown schedule report setting screen (see FIG. 7) can be reopened, under the control of the device list management unit 422.

FIG. 9 illustrates an example of a restricted function file that can be used to enable the image forming apparatus 102 to realize the restricted functions having been set using the shutdown schedule report setting screen (see FIG. 7) and the function restriction detailed settings screen (see FIG. 8).

The function restriction management unit 405 of the image forming apparatus 102 generates the restricted function file illustrated in FIG. 9 and stores the generated restricted function file in the storage unit 207 of the image forming apparatus 102 based on the settings relating to the restricted functions having been set using the screens illustrated in FIG. 7 and FIG. 8 beforehand and stored in the storage unit 207 of the image forming apparatus 102. Then, the system control unit 410 of the image forming apparatus 102 reads the restricted function file from the storage unit 207 and realizes permission or prohibition with respect to each function of the image forming apparatus 102.

According to the example illustrated in FIG. 9, the function "FAX" is prohibited. The function "print" is permitted if the total number is less than 20 pages. The function "copy" is permitted if the total number is less than 20 pages, although detailed settings are prohibited. The contents print service is prohibited. And, the scan service is prohibited.

It will be apparent to those skilled in the art that the restricted function file is not specifically limited in format or in restricting target description method. Further, it will be apparent to those skilled in the art that the realization method according to the present exemplary embodiment is not limited to a method using the restricted function file to restrict the functions of the image forming apparatus 102.

FIG. 10 illustrates an example of a report screen according to the present exemplary embodiment. If the schedule management unit 404 determines that it has reached the report start time included in the schedule information set using the shutdown schedule report setting screen (see FIG. 7) and stored in the storage unit 207 of the image forming apparatus 102, the message management unit 406 displays the report screen illustrated in FIG. 10 on the user interface 209 of the image forming apparatus 102.

A report message display portion 1001 displays a message set in the report message setting portion 703. A restricted function display portion 1002 displays a presently restricted function. A release code input portion 1003 is a restricted function release code input portion that enables a management user or a general user to input a release code to release the restricted function or the shutdown schedule. The restricted function can be released upon inputting a release code in the release code input portion 1003 if the input release code coincides with the above-described release code designated in the restricted function release code designation portion 708 illustrated in FIG. 7. Further, the shutdown schedule can be released upon inputting a release code in the release code input portion 1003 if the input release code coincides with the above-described release code designated in the shutdown schedule release code designation portion 709 illustrated in FIG. 7.

If the report screen illustrated in FIG. 10 is displayed in advance of the scheduled shutdown, it is feasible to notify a general user of the shutdown schedule and let the general user be conscious of a job to be prevented from being executed at the scheduled time. Further, a function to be prevented from being executed at the scheduled shutdown date and time can be restricted stepwise before starting the scheduled shutdown. Further, in case of emergency, by inputting a release code the restricted function or the shutdown schedule can be released from the user interface 209 of the image forming apparatus 102. If an OK button 1004 is pressed, the system control unit 410 closes the report screen illustrated in FIG. 10.

FIG. 11 illustrates an example of the report screen according to the present exemplary embodiment. When the startup detection unit 408 detects a startup of the power source of the image forming apparatus 102 during the power-OFF period having been set in the power-OFF period setting portion 603, the message management unit 406 displays the report screen illustrated in FIG. 11 on the user interface 209 of the image forming apparatus 102. The example illustrated in FIG. 11 is an example screen to be displayed when the option "forcibly shut down immediately" is selected in the power-OFF period setting portion 603.

A release code input portion 1101 is a shutdown release code input portion that enables a management user or a general user to input a release code to release the forcible shutdown. When a release code input in the release code input portion 1101 coincides with the release code designated in the above-described shutdown schedule release code designation portion 709 illustrated in FIG. 7, the shutdown system does not execute the forcible shutdown processing. If an OK button 1102 is pressed, the system control unit 410 closes the report screen illustrated in FIG. 11.

In the present exemplary embodiment, the report screens illustrated in FIG. 10 and FIG. 11 are displayed on the user interface 209 of the image forming apparatus 102. However, the report screens illustrated in FIG. 10 and FIG. 11 can be displayed on a user interface (not illustrated) of the information processing terminal. In this case, the software installed on the information processing terminal of a general user periodically communicates with the image forming apparatus 102. If the image forming apparatus 102 determines that it has reached the report start time, the image forming apparatus 102 returns a report message. The software installed on the information processing terminal of the general user displays the received message on the user interface of the information processing terminal at arbitrary timing.

Further, instead of displaying the report screens illustrated in FIG. 10 and FIG. 11, if the image forming apparatus 102 does not include the user interface 209, the message management unit 406 can control the printing unit 202 of the image forming apparatus 102 to print a report message on paper.

Figure 12:
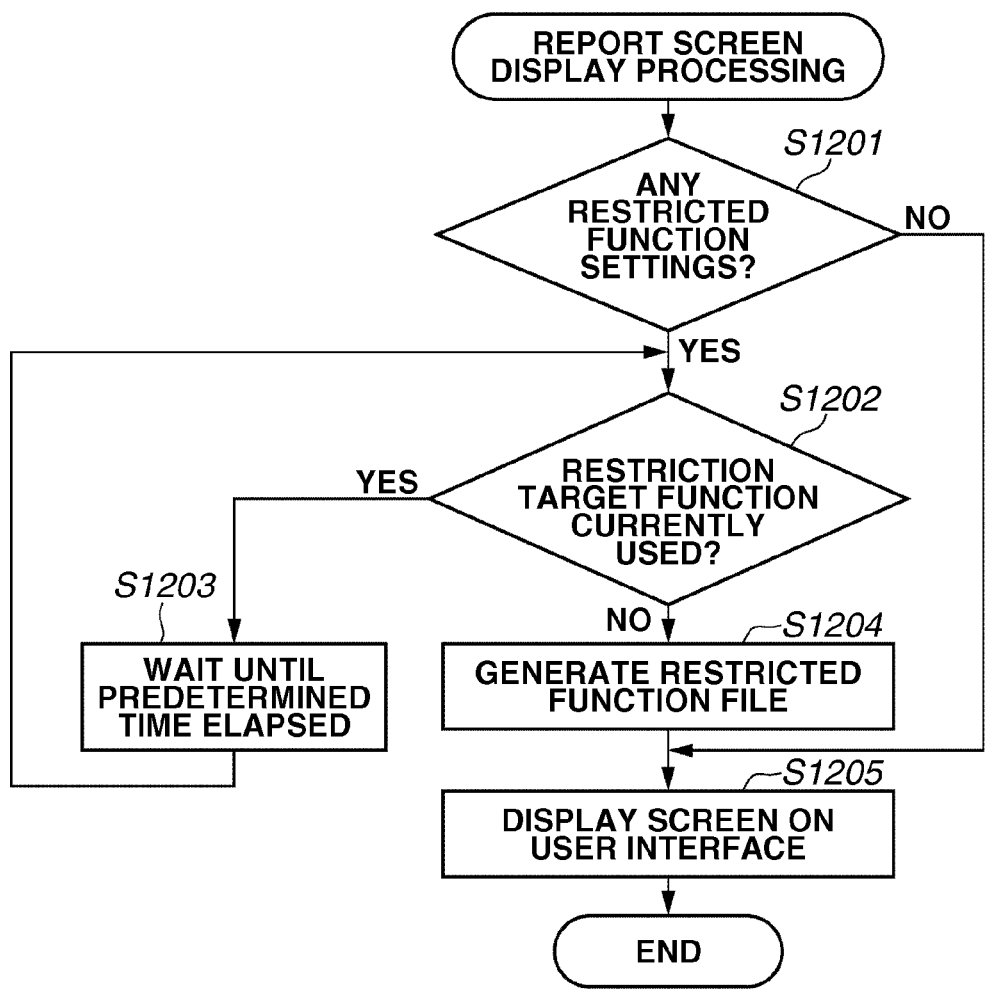
FIG. 12 is a flowchart illustrating an example of processing to be performed when the image forming apparatus displays a report screen.

Example processing that can be performed by the image forming apparatus according to the present invention is described below with reference to flowcharts illustrated in FIG. 12 to FIG. 14. FIG. 12 is a flowchart illustrating an example of the processing that can be performed by the image forming apparatus 102 to display the report screen. The processing in the flowchart can be realized when the CPU 204 of the image forming apparatus 102 executes each program, in the software configuration of the image forming apparatus 102 illustrated in FIG. 4.

First, if the schedule management unit 404 of the image forming apparatus 102 determines that it has reached the report start time based on the schedule information (i.e., the information set using the screens illustrated in FIG. 6 to FIG. 8) stored in the storage unit 207, the function restriction management unit 405 starts executing processing in step S1201.

In step S1201, the function restriction management unit 405 determines whether there is any restricted function setting based on the above-described schedule information.

If it is determined that there is not any restricted function setting (No in step S1201), then in step S1205, the function restriction management unit 405 requests the message management unit 406 to display a message. On the other hand, if it is determined that there is a restricted function setting (Yes in step S1201), then in step S1202, the function restriction management unit 405 determines whether a restriction target function is currently used.

If it is determined that the restriction target function is currently used (Yes in step S1202), then in step S1203, the function restriction management unit 405 waits until a predetermined time elapses. Then, the processing returns to step S1202. More specifically, the function restriction management unit 405 waits until the usage of the restriction target function is completed. In other words, the function restriction management unit 405 prevents the function, if it is currently used by a general user, from being suddenly restricted.

On the other hand, if it is determined that the restriction target function is not currently used (No in step S1202), then in step S1204, the function restriction management unit 405 generates the restricted function file illustrated in FIG. 9 and stores the generated restricted function file in the storage unit 207. In addition, the function restriction management unit 405 requests the message management unit 406 to display a message.

If the message management unit 406 receives the message display request, then in step S1205, the message management unit 406 identifies the report message instructed in the shutdown settings and the restricted functions based on the above-described schedule information and displays the screen illustrated in FIG. 10 on the user interface 209 of the image forming apparatus 102.

Although not illustrated in the drawing, if the restricted function release code or the shutdown schedule release code included in the above-described schedule information is input via the report screen displayed by the processing in step S1205, the application 401 performs control to release the restricted function or the shutdown schedule. More specifically, the application 401 modifies the restricted function settings included in the above-described schedule information in such a way as to cancel the restriction on the functions, and deletes the restricted functions from the restricted function file, or changes the shutdown settings in such a way as to cancel the shutdown processing.

Figure 13:
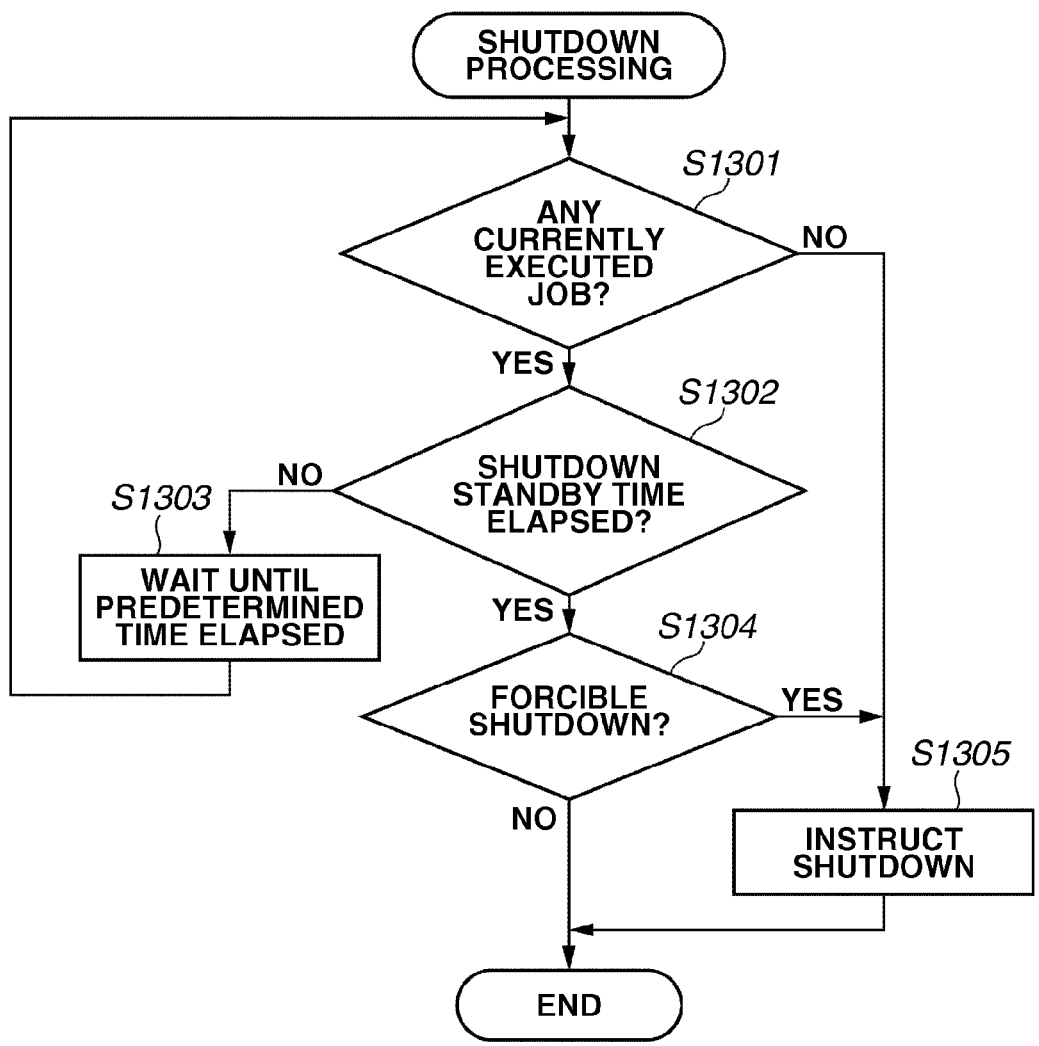
FIG. 13 is a flowchart illustrating an example of processing to be performed when the image forming apparatus performs shutdown processing.

FIG. 13 is a flowchart illustrating an example of the processing that can be performed by the image forming apparatus 102 to perform shutdown processing. The processing in the flowchart can be realized when the CPU 204 of the image forming apparatus 102 executes each program, in the software configuration of the image forming apparatus 102 illustrated in FIG. 4.

First, if the schedule management unit 404 of the image forming apparatus 102 determines that it is the timing for the shutdown schedule based on the schedule information (i.e., the information set using the screens illustrated in FIG. 6 to FIG. 8) stored in the storage unit 207, the function restriction management unit 405 starts executing processing in step S1301.

In step S1301, the job confirmation unit 403 determines whether there is a currently executed job. If it is determined that there is not any job currently executed (No in step S1301), then in step S1305, the shutdown request unit 407 instructs the shutdown control unit 411 to perform shutdown processing.

On the other hand, if it is determined that a currently executed job is present (Yes in step S1301), then in step S1302, the job confirmation unit 403 determines whether the standby time set in the "operation to be performed if any job is currently executed" setting portion 604 has elapsed, based on the above-described schedule information.

Then, if it is determined that the set standby time has not yet elapsed (No in step S1302), then in step S1303, the job confirmation unit 403 waits until a predetermined time elapses. Then, the processing returns to step S1301 again.

On the other hand, if it is determined that the set standby time has elapsed (Yes in step S1302), the shutdown request unit 407 executes processing in step S1304. In step S1304, the shutdown request unit 407 determines whether the option "forcibly shut down if standby time has elapsed" is set in the "operation to be performed if any job is currently executed" setting portion 604, based on the above-described schedule information.

Then, if it is determined that the option "forcibly shut down if standby time has elapsed" is not set (No in step S1304), the shutdown request unit 407 terminates the processing in the present flowchart without instructing the shutdown processing.

On the other hand, if it is determined that the option "forcibly shut down if standby time has elapsed" is set (Yes in step S1304), then in step S1305, the shutdown request unit 407 cancels the currently executed job and instructs the shutdown control unit 411 to perform shutdown processing.

Figure 14:
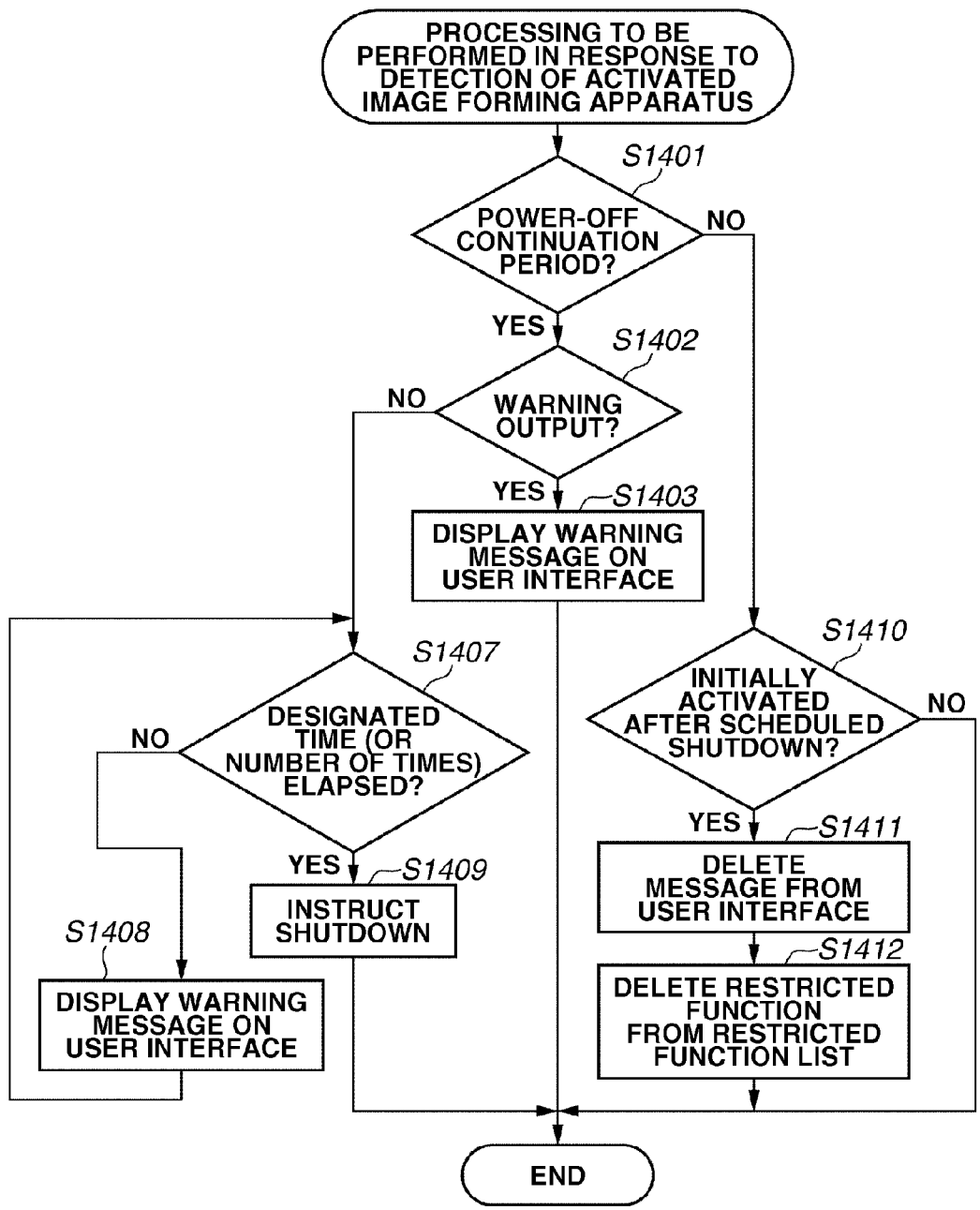
FIG. 14 is a flowchart illustrating an example of processing to be performed when the image forming apparatus has been activated.

FIG. 14 is a flowchart illustrating an example of processing to be performed when the image forming apparatus 102 has been activated. The processing in the flowchart can be started by the application 401 when the startup detection unit 408 detects the startup of the image forming apparatus 102. The processing in the flowchart can be realized when the CPU 204 of the image forming apparatus 102 executes each program in the software configuration of the image forming apparatus 102 illustrated in FIG. 4.

In the present exemplary embodiment, the application 401 is executed by the image forming apparatus 102. Therefore, the startup detection unit 408 of the application 401 detects the startup of the image forming apparatus 102 by receiving a startup event notified to the application 401 upon activation of the image forming apparatus 102. The startup detection unit 408 starts the processing of the flowchart illustrated in FIG. 14.

First, in step S1401, the schedule management unit 404 determines whether the activated date and time is in the period set in the power-OFF period setting portion 603, based on the schedule information (i.e., the information set using the screens illustrated in see FIG. 6 to FIG. 8) stored in the storage unit 207.

If it is determined that the activated date and time is in the power-OFF state continuation period (Yes in step S1401), then in step S1402, the schedule management unit 404 confirms processing to be performed when the image forming apparatus 102 is activated before the completion date and time.

In step S1402, the schedule management unit 404 determines whether the setting content is the option "output warning", based on the above-described schedule information. Then, if it is determined that the setting content is the option "output warning" (Yes in step S1402), the message management unit 406 executes processing in step S1403.

In step S1403, the message management unit 406 displays a warning message (not illustrated, e.g., "The power-OFF period starts shortly. Please power down the system."), on the user interface 209 of the image forming apparatus 102. Then, the message management unit 406 terminates the processing in the present flowchart.

On the other hand, if it is determined that the setting content is not the option "output warning", more specifically, if it is determined that the setting content is the option "forcibly shut down immediately" or the option "shut down after designated time has elapsed", or the option "shut down after detection of designated number of logouts" (No in step S1402), the processing proceeds to step S1407.

In step S1407, the schedule management unit 404 determines whether the designated time or the designated number of times has elapsed, based on the above-described schedule information. In the present exemplary embodiment, even when the option "forcibly shut down immediately" is selected, the schedule management unit 404 waits until 30 seconds elapse as illustrated in FIG. 11. More specifically, the designated time is equal to 30 seconds.

Then, if it is determined that the designated time or the designated number of times has not yet elapsed (No in step S1407), then in step S1408, the message management unit 406 displays the warning message illustrated in FIG. 11 on the user interface 209 of the image forming apparatus 102. Then, the processing returns to step S1407.

On the other hand, if it is determined that the designated time or the designated number of times has elapsed (Yes in step S1407), the shutdown request unit 407 executes processing in step S1409. In step S1409, the shutdown request unit 407 instructs the shutdown control unit 411 to perform shutdown processing.

Although not illustrated in the drawing, if the release code is input before it is determined that the designated time or designated number of times has elapsed in step S1407, the shutdown request unit 407 terminates the processing in the present flowchart without instructing shutdown.

Further, if it is determined that the activated date and time is not in the power-OFF state continuation period (No in step S1401), the schedule management unit 404 executes processing in step S1410. In step S1410, the schedule management unit 404 determines whether the image forming apparatus 102 is initially activated after the scheduled shutdown.

If it is determined that the image forming apparatus 102 is initially activated (Yes in step S1410), then in step S1411, the message management unit 406 deletes the message from the user interface 209 of the image forming apparatus 102. Further, in step S1412, the function restriction management unit 405 deletes the restricted functions from the restricted function file, and terminates the processing of the present flowchart.

On the other hand, if it is determined that the image forming apparatus 102 is not initially activated (No in step S1410), the message management unit 406 directly terminates the processing in the present flowchart.

As described above, the shutdown system according to the present exemplary embodiment can reduce the probability of the presence of a general user's job at the time when the image forming apparatus 102 is shut down, so that a shutdown operation for the image forming apparatus 102 can be performed at the scheduled date and time. Further, the shutdown system according to the present exemplary embodiment can maintain the power-OFF state of the image forming apparatus 102 during a designated period.

Figure 15:
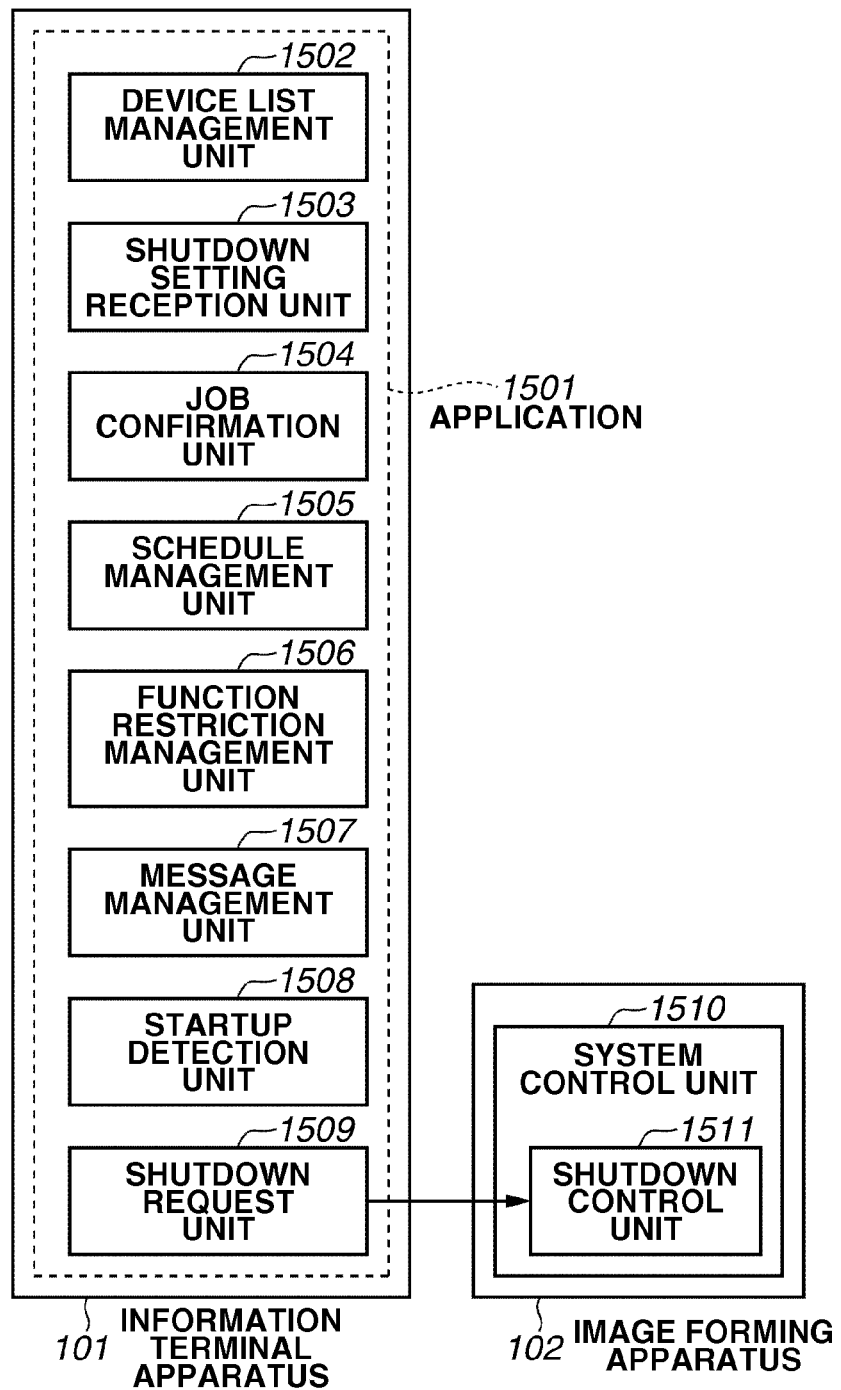
FIG. 15 is a block diagram illustrating an example of a software configuration of each apparatus included in a shutdown system according to a second exemplary embodiment.

According to a second exemplary embodiment, a shutdown system has a configuration similar to that illustrated in FIG. 1 and a hardware configuration similar to those illustrated in FIG. 2 and FIG. 3, which are described in the first exemplary embodiment. FIG. 15 is a block diagram illustrating an example software configuration of each apparatus that constitutes the shutdown system according to the second exemplary embodiment. The shutdown system according to the second exemplary embodiment includes an application 1501 that is installed on the information terminal apparatus 101, although the shutdown system according to the first exemplary embodiment includes the application 401 installed on the image forming apparatus 102. Therefore, in the second exemplary embodiment, no application is installed on the image forming apparatus 102.

According to the first exemplary embodiment, the information terminal apparatus 101 is configured to simultaneously perform shutdown settings for the application 401 of each image forming apparatus 102 selected in the device list (see FIG. 5). On the contrary, according to the second exemplary embodiment, the information terminal apparatus 101 is configured to provide the scheduled shutdown function itself to each image forming apparatus 102 selected in the device list (see FIG. 5) via the network 100.

Software functions illustrated in FIG. 15 are similar to those described in the first exemplary embodiment, except for a device list management unit 1502, a shutdown setting reception unit 1503, a startup detection unit 1508, and a shutdown request unit 1509. More specifically, in configuration, a job confirmation unit 1504 is similar to the job confirmation unit 403. A schedule management unit 1505 is similar to the schedule management unit 404. A function restriction management unit 1506 is similar to the function restriction management unit 405. A message management unit 1507 is similar to the message management unit 406.

According to the first exemplary embodiment, the device list management unit 422 sends the schedule information (i.e., the information set using the screens illustrated in FIG. 6 to FIG. 8) to the shutdown setting transmission unit 421. The shutdown setting transmission unit 421 transmits the schedule information to the shutdown setting reception unit 402. On the contrary, according to the second exemplary embodiment, the device list management unit 1502 is configured to send schedule information to the shutdown setting reception unit 1503.

Further, according to the first exemplary embodiment, the startup detection unit 408 detects a startup of the image forming apparatus 102 by receiving a startup event notified to the application 401 upon activation of the image forming apparatus 102. On the contrary, according to the second exemplary embodiment, the startup detection unit 1508 is configured to detect a startup of the image forming apparatus 102 by receiving a network packet that can be issued from the activated image forming apparatus 102 to the network 100.

Further, according to the first exemplary embodiment, the shutdown request unit 407 requests the shutdown control unit 411 provided in the same apparatus to perform shutdown processing. On the contrary, according to the second exemplary embodiment, the shutdown request unit 1509 is configured to request the shutdown control unit 411 of a target image forming apparatus 102 to perform shutdown processing via the network.

As described above, the shutdown system according to the second exemplary embodiment does not require the application 401 to be installed on the image forming apparatus 102 described in the first exemplary embodiment. For example, compared to the first exemplary embodiment, it is feasible to save the computer resource such as a ROM capacity or the CPU of the image forming apparatus 102.

The configuration and contents of various data pieces are not limited to specific examples. It is needless to say that the above-described various data pieces can be modified appropriately in configuration and contents considering the usage and purpose.

Although the present invention is described with reference to some exemplary embodiments, the present invention can be embodied, for example, as a system, an apparatus, a method, a program, or a storage medium. More specifically, the present invention can be applied to a system that includes a plurality of devices and an apparatus that includes only one device. Further, the present invention encompasses a configuration that combines the above-described exemplary embodiments.

As described above, the shutdown system according to the present invention has the capability of forcibly shutting down an image forming apparatus located in an office as scheduled using an application installed on the image forming apparatus. For example, the shutdown system according to the present invention is useful to forcibly shut down an image forming apparatus located in an office as predetermined date and time, for example, when a legal inspection of an office is scheduled.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-225669 filed Oct. 13, 2011, which is hereby incorporated by reference herein in its entirety.

What is claimed is:

1. An image forming apparatus, comprising:
    a storage unit configured to store schedule information that includes shutdown execution date and time, as date and time scheduled to execute a shutdown operation for the image forming apparatus;
    a shutdown unit configured to control the image forming apparatus to perform shutdown at the shutdown execution date and time included in the schedule information;
    a restricting unit configured to restrict at least part of a plurality of functions of the image forming apparatus stepwise at timing earlier than the shutdown execution date and time included in the schedule information;
    a notification unit configured to notify a user of a message whose content is differentiated in each of the steps; and
    a detection unit configured to detect a startup of the image forming apparatus in the power-OFF period,
    wherein the schedule information includes power-OFF period information that indicates a period during which the image forming apparatus is to be maintained in a power-OFF state,
    wherein, if the detection unit detects the startup of the image forming apparatus, the notification unit is configured to notify a user of a message that informs execution of a forcible shutdown and the shutdown unit is configured to forcibly shut down the image forming apparatus.

2. The image forming apparatus according to claim 1, wherein the schedule information includes at least one piece of information that designates a period corresponding to each of the steps.

3. The image forming apparatus according to claim 1, further comprising:
    a shutdown release code input unit configured to receive an input of a shutdown schedule release code if the detection unit detects the startup of the image forming apparatus,
    wherein the shutdown unit does not forcibly shut down the image forming apparatus, if the shutdown release code input unit has received the input of the shutdown schedule release code.

4. The image forming apparatus according to claim 1, wherein the schedule information includes restricted function information that indicates functions to be restricted at respective restriction steps.

5. The image forming apparatus according to claim 1, wherein the restricting unit is configured to restrict at least one of a function for discharging sheets include a plurality of pages whose number exceeds a predetermined value, a function for queuing a plurality of jobs whose number is equal to or greater than a predetermined value, and a function for performing detailed copy settings.

6. The image forming apparatus according to claim 1, wherein the restricting unit is configured to restrict at least one of a function for executing a new job contrary to a warning of a remaining amount of consumables and a function for executing a job that requires network communication.

7. The image forming apparatus according to claim 1, wherein the restricting unit is configured to restrict a billing target function.

8. The image forming apparatus according to claim 1, further comprising:
   a restricted function release code input unit configured to receive an input of a restricted function release code in each of the steps,
   wherein, if the restricted function release code input unit receives the input of the restricted function release code, the restricting unit does not perform the restriction of the function.

9. The image forming apparatus according to claim 1, wherein the schedule information is received from a communicatable management apparatus via a network.

10. A method for controlling an image forming apparatus, the method comprising:
   controlling the image forming apparatus to perform shutdown at shutdown execution date and time included in predetermined schedule information, as date and time scheduled to execute a shutdown operation for the image forming apparatus;
   restricting at least part of a plurality of functions of the image forming apparatus stepwise at timing earlier than the shutdown execution date and time included in the schedule information;
   notifying a user of a message whose content is differentiated in each of the steps; and
   detecting a startup of the image forming apparatus in the power-OFF period,
   wherein the schedule information includes power-OFF period information that indicates a period during which the image forming apparatus is to be maintained in a power-OFF state,
   wherein, if the detecting detects the startup of the image forming apparatus, the notification is configured to notify a user of a message that informs execution of a forcible shutdown and the shutdown is configured to forcibly shut down the image forming apparatus.

11. A non-transitory computer readable storage medium on which is stored a computer program for making a computer execute a method for an image forming apparatus, the method comprising the steps of:
   controlling the image forming apparatus to perform shutdown at shutdown execution date and time included in predetermined schedule information, as date and time scheduled to execute a shutdown operation for the image forming apparatus;
   restricting at least part of a plurality of functions of the image forming apparatus stepwise at timing earlier than the shutdown execution date and time included in the schedule information; and
   notifying a user of a message whose content is differentiated in each of the steps; and
   detecting a startup of the image forming apparatus in the power-OFF period,
   wherein the schedule information includes power-OFF period information that indicates a period during which the image forming apparatus is to be maintained in a power-OFF state,
   wherein, if the detecting detects the startup of the image forming apparatus, the notification is configured to notify a user of a message that informs execution of a forcible shutdown and the shutdown is configured to forcibly shut down the image forming apparatus.

* * * * *